US010484929B2

(12) United States Patent
Jayawickrama et al.

(10) Patent No.: US 10,484,929 B2
(45) Date of Patent: Nov. 19, 2019

(54) ACCESS NODE CONTROLLER, AN APPARATUS FOR AN ACCESS NODE, AN ACCESS NODE FOR A MOBILE COMMUNICATION SYSTEM, A MOBILE COMMUNICATION SYSTEM, A METHOD AND A COMPUTER PROGRAM FOR AN ACCESS NODE

(71) Applicant: Intel Corporation, Santa Clara, CA (US)

(72) Inventors: Beeshanga Jayawickrama, Sydney (AU); Ying He, Sydney (AU); Srikathyayani Srikanteswara, Portland, OR (US); Markus Dominik Mueck, Sydney (AU); Eryk Dutkiewicz, Sydney (AU); Christian Drewes, Sydney (AU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/638,491

(22) Filed: Jun. 30, 2017

(65) Prior Publication Data

US 2019/0007889 A1     Jan. 3, 2019

(51) Int. Cl.
*H04W 48/04*    (2009.01)
*H04W 16/14*    (2009.01)
(Continued)

(52) U.S. Cl.
CPC ......... *H04W 48/04* (2013.01); *H04W 16/14* (2013.01); *H04W 24/02* (2013.01);
(Continued)

(58) Field of Classification Search
CPC ..................... H04W 4/021; H04W 64/003
See application file for complete search history.

(56) References Cited

U.S. PATENT DOCUMENTS

2004/0029592 A1* 2/2004 Shyy .................. H04L 45/02
                                                      455/453
2008/0233948 A1* 9/2008 Kazmi ............... H04W 72/082
                                                      455/423

(Continued)

FOREIGN PATENT DOCUMENTS

WO    2016195751 A1    12/2016
WO    2017065852 A1     4/2017

OTHER PUBLICATIONS

Huawei et al: "Coexistence and channel acces for NR-based unlicensed band operation", 3GPP Draft; R1-1711467, 3rd Generation Partnership Project (3GPP), Mobile Competence Centre; 650, Route Des Lucioles; F-06921 Sophia-Antipolis Cedex; France, vol. RAN WG1, no. Qingdao, China; Jun. 27, 2017-Jun. 30, 2017, Jun. 26, 2017 (Jun. 26, 2017), XP051300652, Retrieved from the internet: URL:http://www.3gpp.org/ftp/Meetings_3GPP_SYNC/RAN1/Docs/.

*Primary Examiner* — Melanie Jagannathan
(74) *Attorney, Agent, or Firm* — 2SPL Patent Attorneys PartG mbB; Kieran O'Leary

(57) ABSTRACT

Examples provide an access node controller, an apparatus for an access node, an access node for a mobile communication system, a mobile communication system, method and computer program for an access node. The access node controller is configured to determine one or more transmission parameters for a first access node of a mobile communication system. The mobile communication system further comprises a second access node. The access node controller comprises one or more interfaces configured to obtain priority area information of the second access node. The second access node has priority access in the priority area compared to the first access node. The access node controller comprises a control module configured to control the one or more interfaces and configured to determine the one or more (Continued)

transmission parameters for the first access node based on the priority area information of the second access node and based on an access condition at a priority area boundary.

21 Claims, 13 Drawing Sheets

(51) Int. Cl.
  H04W 24/02 (2009.01)
  H04W 52/36 (2009.01)
  H04W 72/08 (2009.01)
  H04W 72/10 (2009.01)
(52) U.S. Cl.
  CPC ....... *H04W 52/367* (2013.01); *H04W 72/082* (2013.01); *H04W 72/10* (2013.01)

(56) References Cited

U.S. PATENT DOCUMENTS

| | | | |
|---|---|---|---|
| 2009/0075651 A1* | 3/2009 | MacNaughtan | G01S 5/0252 455/434 |
| 2012/0129467 A1 | 5/2012 | Wang et al. | |
| 2014/0022920 A1* | 1/2014 | Dua | H04W 4/021 370/252 |
| 2015/0326463 A1* | 11/2015 | Solondz | H04L 43/0829 370/252 |
| 2016/0150547 A1* | 5/2016 | Ali | H04W 72/1294 370/252 |
| 2017/0099115 A1* | 4/2017 | Miller, II | H04W 24/08 |
| 2018/0184303 A1* | 6/2018 | Egner | H04W 16/18 |

\* cited by examiner

ACCESS NODE CONTROLLER, AN APPARATUS FOR AN ACCESS NODE, AN ACCESS NODE FOR A MOBILE COMMUNICATION SYSTEM, A MOBILE COMMUNICATION SYSTEM, A METHOD AND A COMPUTER PROGRAM FOR AN ACCESS NODE

FIELD

Examples relate to an access node controller, an apparatus for an access node, an access node for a mobile communication system, a mobile communication system, a method and a computer program for an access node, and in particular, but not exclusively, to a concept and mechanism for interference coordination in a spectrum or licensed shared access system of a mobile communication system.

BACKGROUND

With the growing demand for wireless services, Radio Frequency (RF) circuits become more and more versatile. For example, the number of wireless access technologies and the frequency range in which mobile communication systems are active are growing, wherein a physical size and power consumption of RF units is decreasing. For example, $5^{th}$ Generation (5G) systems may operate using mm-wave technology, e.g. the U.S. Federal Communications Commission (FCC) approved spectrum for 5G, including the 28, 37, and 39 GHz bands.

The FCC also released a Report and Order on Apr. 17, 2015 outlining the rules for operating wireless devices in the 3.5 GHz band that spans from 3550-3700 MHz. FCC released this spectrum for sharing with incumbents. The incumbents (mainly DoD, Department of Defense) get priority in that band and it can be used by broadband devices when (and where) incumbents are not using the spectrum. There are two additional tiers of spectrum users in addition to the incumbents namely the Priority Access (PA) and General Authorized Access (GAA) users. The Priority Access Licenses (PAL) users get protection from GAA users, which is similar to unlicensed spectrum.

The FCC also mandates a Spectrum Access System (SAS) that will coordinate the spectrum use between the incumbents, PAL and GAA users. The SAS is central to this band, and no tier 2 or tier 3 device can operate unless it is in constant communication with the SAS and receives information of when and where to use the 3.5 GHz channels. The SAS has to be approved by the FCC before it can be deployed. Since the SAS is the central coordinator for this spectrum, it needs to have a lot of information about the network and devices. In fact, FCC mandates most of this information to be contained in the SAS. FCC's Report and Order outlines a sample system with SAS(s). If there are multiple SASs, they are supposed to be synchronized with each other. However, the FCC does not specify details of how the SAS have to be implemented and what information has to be synchronized.

In Europe a Licensed Shared Access (LSA) concept has been proposed in which a first tier supports incumbent users and a second tier supports licensee users, e.g. at 2.3-2.4 GHz (cf. Long Term Evolution Band 40). Incumbents are protected using a data base at an LSA controller controlling the second tier access nodes.

Spectrum management entities like SAS (3.5 GHz in USA) or LSA (2.3 GHz in EU) are new entities that are now part of the wireless communications network. SAS and LSA concepts are not limited to a certain frequency band and may also be applied to any other frequency band, typically between 0 Hz and 1 THz. The SAS system is also known as Citizen Broadband Radio Service (CBRS).

BRIEF DESCRIPTION OF THE FIGURES

Some examples of circuits, apparatuses, methods and/or computer programs will be described in the following by way of example only, and with reference to the accompanying figures, in which.

DETAILED DESCRIPTION

Figure 1:
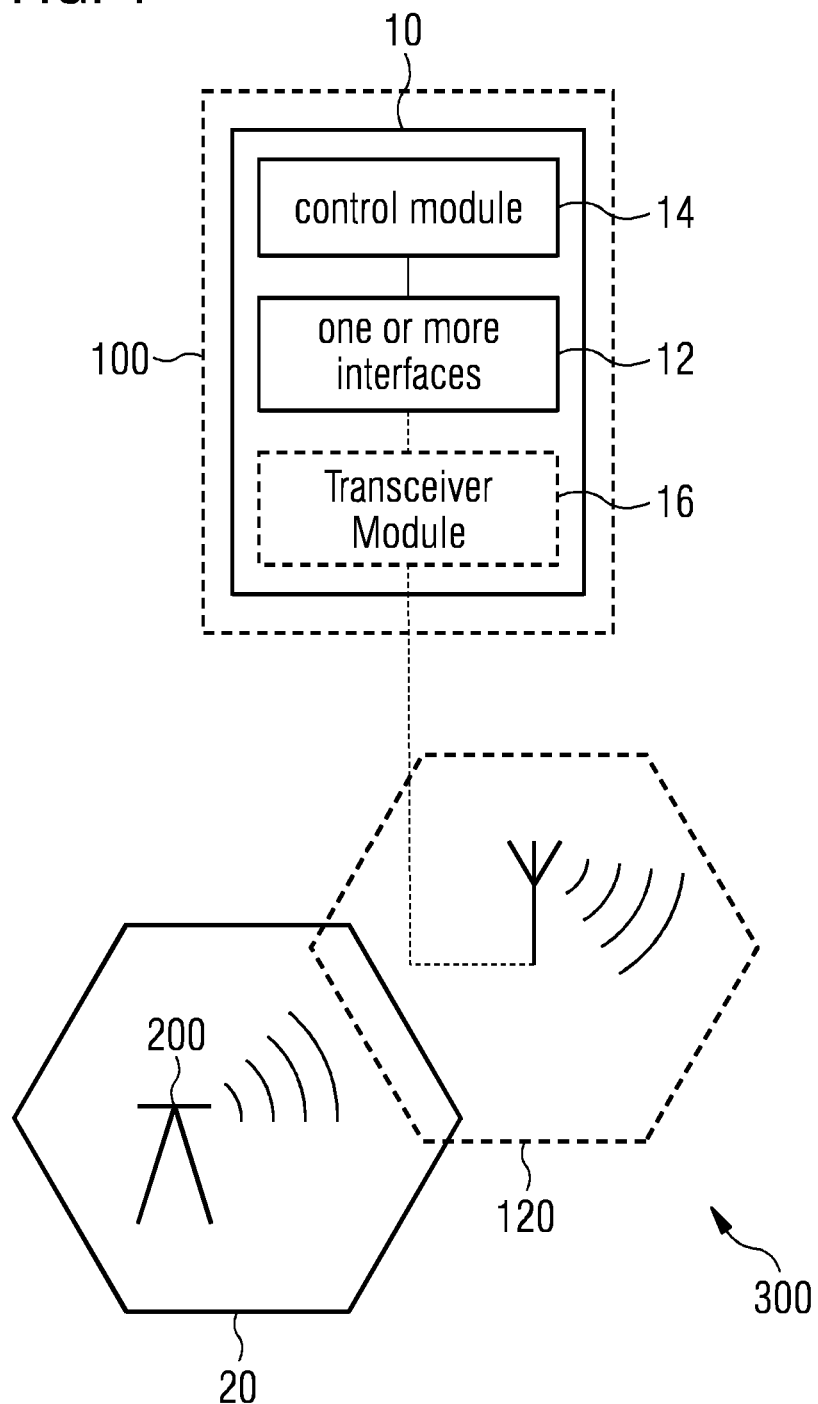
FIG. 1 illustrates examples of an access node controller, an apparatus for an access node, an access node and a mobile communication system.

Various examples will now be described more fully with reference to the accompanying drawings in which some examples are illustrated. In the figures, the thicknesses of lines, layers and/or regions may be exaggerated for clarity. Optional components in the Figs. are shown using broken or dashed lines. Similar reference signs reference similar components throughout the drawings.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples relate to networks having access nodes of different categories, also referred to first access nodes and second access nodes herein. The second access nodes have priority access compared to the first access node, where such priority access relates to a certain priority area. Such networks are SAS and LAS, to which examples are however not restricted to, but rather apply to networks having at least one access node with priority access over at least one other access node. In some examples priority access may have different meanings, characteristics, or requirements including i) the priority user has a guaranteed maximum interference level created by other devices or ii) non-priority devices may not operate at all close to the priority user and thus perfect signal quality is guaranteed, etc.

Examples may address the choice of maximum output power levels for access nodes, e.g. General Authorized Access (GAA), users in the context of SAS based spectrum sharing as defined by FCC in 3.55-3.7 GHz (extensions to>24 GHz and the 3.8-4.2 GHz band are currently under discussions in US and UK), LSA, respectively. Examples may guarantee maximum interference levels to priority access nodes, e.g. Priority-Access-License (PAL) Users.

The terms GAA and first access node, as well as the terms PAL and second access node are used interchangeably herein.

Examples are based on the finding that state of the art SAS/LSA solutions suggest a centralized approach (SAS central controller is collecting all information and attributes power levels). Examples may use a distributed way such that context information provided to the central SAS controller can be reduced, minimized or even (theoretically) eliminated. Examples may therefore enable interference coordination in SAS/LAS or other networks without necessitating mobile network operators to share their context information.

Examples may enable distributed power allocation and beamforming approaches based on the introduction/assumption of "virtual GAA users", which may help to characterize the worst case and identify maximum transmission limits. Examples may allow each GAA or access node estimating its transmit power and beamforming scheme according to a PAL protection area and the maximum transmit power level for all GAAs without the need of coordination or location sharing between GAAs and PAL. Examples may keep the aggregated interference from all GAAs to the PAL protection area below a certain threshold. Examples may allow approximating access nodes' maximum transmit power closely to the maximum system capacity, which can be achieved by sharing all location information.

At least some examples may determine a maximum output power level of a given GAA user by assuming other "hypothetical GAA" users being located just outside of the Listen before Talk (LBT) minimum distance. LBT is a concept in which access nodes sense an interference level before transmission, and transmit in case the interference level lies below a possibly pre-defined threshold while suspending transmission otherwise. The maximum transmit power of a given GAA user may be determined by assuming that all "hypothetical GAA users" are transmitting at the maximum possible power level. The overall interference at the PAL protection area (at the point closest to the given GAA user) may be kept below the maximum allowed level by applying this maximum possible output power level.

FIG. 1 illustrates examples of an access node controller 10, an apparatus 10 for an access node, an access node 100 and a mobile communication system 300. In the following multiple examples will be described in detail. The described access node controller 10 corresponds to an apparatus 10 for an access node 100. The components of the apparatus 10 are defined as component means which correspond to the respective structural components of the access node controller 10.

FIG. 1 shows an access node controller 10 for determining one or more transmission parameters of a first access node 100 of a mobile communication system 300. Examples also provide an access node 10 comprising the access node controller 10 or apparatus 10. A further example is a mobile communication system 300 comprising one or more examples of an access node 100. For example, the mobile communication system 300 comprises the first access node 100 and a second access node 200, which has priority access in the mobile communication system compared to the first access node 100. In some examples the mobile communication system 300 may comprise multiple first access nodes 100 and multiple second access nodes 200. The second access nodes 200 may have priority access in the mobile communication system 300 compared to the first access nodes 100. The first access nodes 100 may be configured to sense an interference level in the mobile communication system 300 before transmitting and the first access nodes 100 are configured to suspend transmission if a sensed interference level is above a transmission threshold.

As shown in FIG. 1 the second access node 200 serves an area 20, which will also be referred to as priority area 20 in the following and which may correspond to a coverage area of the second access node 200. The first access node 100 has a coverage area 120 which may, at least partly overlap with the priority area 20 of the second access node 200.

In examples the mobile communication system 300 may correspond to any Radio Access Technology (RAT). The corresponding access nodes (base stations, relay stations, etc.) may, for example, operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (WCDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code Division Multiple Access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Public Land Mobile Telephony), MTD (Swedish abbreviation for Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

Moreover, the mobile communication system may be used or operated in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc.). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, lowlatency, drones, etc. applications. Note furthermore that a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. In examples other hierarchical approaches are also possible.

Examples may also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. In vehicular communications (such as IEEE 802.11p, LTE CV2X, V2V (Vehicle-to-Vehicle), V2I (Vehicle-to-Infrastructure), V2P (Vehicle-to-Person), etc. communications) or other safety related contexts, a priority user may relate to "safety related applications" users while the non-priority users may relate to "non-safety related applications". Some examples may provide protection of priority users—in order to protect the correct operation of such safety related applications. Non-safety applications are less critical and a failure may be tolerated. The same scheme may be employed for any prioritization of "higher priority applications" vs "lower priority applications" in the vehicular communications context or any other context.

In some examples the protection can be in three dimensions. For example if the spectrum is shared with satellites, drones, or other objects moving above ground, the sky above a certain altitude (including the satellite special slots) would become a priority area or zone and the interference to satellites due to terrestrial communication might be reduced or even minimized. Here, it may be sufficient in some examples to impose suitable antenna patterns such that emissions remain in the terrestrial space and do not radiate into space. If the multipath/scattering environment becomes too challenging for some users (at least some emission power may always radiate towards the satellite), this user may be forced to reduce its output power levels, to switch to another frequency band or similar.

An access node, base station or base station transceiver 100, 200 can be operable to communicate with one or more active mobile transceivers or terminals and a base station transceiver can be located in or adjacent to a coverage area of another base station transceiver, e.g. a macro cell base station transceiver or small cell base station transceiver. Hence, examples may provide a mobile communication system 300 comprising one or more mobile transceivers and one or more base station transceivers 100, 200, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, etc. A mobile transceiver may also be referred to as UE or mobile in line with the 3GPP terminology.

A base station transceiver 100, 200 can be located in the fixed or stationary part of the network or system 300. A base station transceiver 100, 200 may correspond to a remote radio head, a transmission point, an access point or access node, a macro cell, a small cell, a micro cell, a femto cell, a metro cell, etc. A base station transceiver 100, 200 can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver 100, 200 may correspond to a NodeB, an eNodeB, a Base Transceiver Station (BTS), an access point, a remote radio head, a transmission point, etc., which may be further divided into a remote unit and a central unit.

As further shown in FIG. 1 the access node controller 10 comprises one or more interfaces 12 configured to obtain priority area information of the second access node 200 in the mobile communication system 300. The second access node 200 has priority access in a priority area 20 compared to the first access node 100. In examples the one or more interfaces 12 may correspond to any means for obtaining, receiving, transmitting or providing analog or digital signals or information, e.g. any connector, contact, pin, register, input port, output port, conductor, lane, etc. which allows providing a signal. An interface 12 may be wireless or wireline and it may be configured to communicate, i.e. transmit or receive signals or information with further internal or external components.

The access node controller 10 comprises a control module 14, which is coupled to the one or more interfaces 12 and configured to control the one or more interfaces 12. The control module 14 may be configured to determine the one or more transmission parameters of the first access node 100 based on the priority area information of the second access node 200 and based on an access condition at a priority area boundary. In examples the control module 14 may be implemented using one or more processing units, one or more processing devices, any means for processing, any means for determining, any means for calculating, such as a processor, a computer or a programmable hardware component being operable with accordingly adapted software. In other words, the described function of the control module 14 may as well be implemented in software, which is then executed on one or more programmable hardware components. Such hardware components may comprise a general purpose processor, a Digital Signal Processor (DSP), a micro-controller, etc.

The mobile communication system 300 may further comprise the second access node 200. Examples may use a distributed approach based on the priority area information such that the first access node 100 is enabled to determine its transmission parameters without knowledge of all location information. Hence, there may be a reduced need for a potential central controller, e.g. an SAS controller, to collect and centrally determine transmission parametrization for the access nodes in the network (there could be a high number of first and second access nodes) and overall signaling efforts may be reduced as the distribution of the outcome of the central computation among the access nodes of the network may be reduced or even (theoretically) avoided. For example, information sharing between GAAs may be reduced. As location (and other context) information may be regarded as private information to operators, example may allow to keep such private information within the respective operators' network.

At least some examples might not require location information of GAAs to be shared. For example, each first access node 100, e.g. a GAA, may calculate its own transmit power or beamforming settings and there might not be any need for any central assignments, e.g. by an SAS controller. Some examples may reduce coordination efforts between all GAAs using a distributed approach enabling individual processing in one access node only, e.g. in one GAA base station, which may be more flexible, robust and may have less communication overhead. For example, when using central processing, complexity might not be not scalable as it results in $N*S^2$ messages with information about each base station to be sent where N is the number of base stations and S is the number of communication system, e.g. SASs serving the area. Examples may eliminate these messages and may make the system scalable even for massive Internet of Things (IoT) and such applications.

In general terms, examples may address interference mitigation solutions for spectrum sharing, for example, in 3.5 GHz (US Spectrum Access System (SAS)) and/or 2.3-2.4 GHz in Europe (Licensed Shared Access (LSA)). For example, General Authorized Access (GAA) users' power and beamforming management to mitigate the aggregate interference to the Priority Access Licensee (PAL) protection area may be controlled. The FCC requires that the aggregate interference from all GAAs to anywhere along or inside of the PAL protection area to be below a certain threshold. However, the location of GAAs or PAL will not be shared with each other due to privacy concerns of the operators.

Examples may use algorithms and methods to protect one or more second access nodes 200 with priority access, e.g PAL users (tier two), from aggregated interference from other access nodes, e.g. one or more first access nodes 100 or other second access nodes 200, for example PAL or GAA (tier three), users to the priority area 20, e.g. a PAL protection area. Such behavior may be considered a mandatory requirement of the FCC 16-55A1. While it may be relatively straightforward to design an interference mitigation algorithm where each network entity and SAS knows the complete details of all the base stations (like location, Tx power, etc.), such solution may have drawbacks. For example, operators might not like to share such details—to the point of not using the band if they are forced to share such information. Any large complex system that relies on real-time instantaneous knowledge of the whole network at each SAS may be inherently un-stable and impractical. A slight delay in transmitting one of the values could result in the system breaking or shutting down and causing interference.

In some examples, the SAS node is outside of a concerned network (e.g., governed by another operator, etc.) and thus detailed network configuration information would have to be shared with an outside entity to allow central processing. Mobile Network Operators (MNOs) typically try to minimize the information to be shared, because it is considered to be business essential confidential information. Examples may deviate from the central concept in which the SAS knows everything about the location and power configuration of all clients. In examples, the SAS may rather outline specific rules to be met by client devices and they organize themselves using rules and public information about the incumbent/PAL exclusion zones. Examples may avoid any transfer of confidential location and configuration information to the SAS (both can be completely masked). Some examples of access nodes may i) receive SAS rules, ii) identify distance to incumbent/PAL "protection zone", iii) identify client zone in function of the determined distance, iv) identify possible surrounding clients by LBT (Listen Before Talk) and finally v) select the suitable output power level meeting the protection zone requirements.

In some embodiments, the access node controller 10 may comprise a transceiver module 16 (shown in FIG. 1 as optional component using broken lines), which is configured to transmit and receive wireless signals in the mobile communication system 300. The control module 14 is coupled to the transceiver module 16 and configured to control the transceiver module 16. The control module 14 may be configured to sense an interference level using the transceiver module 16 and to suspend transmission of the first access node 100 if a sensed interference level is above a transmission threshold. In examples the transceiver module 16 may comprise typical transceiver components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The transceiver module 16 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field, a field array, combinations thereof, etc.

Figure 2:
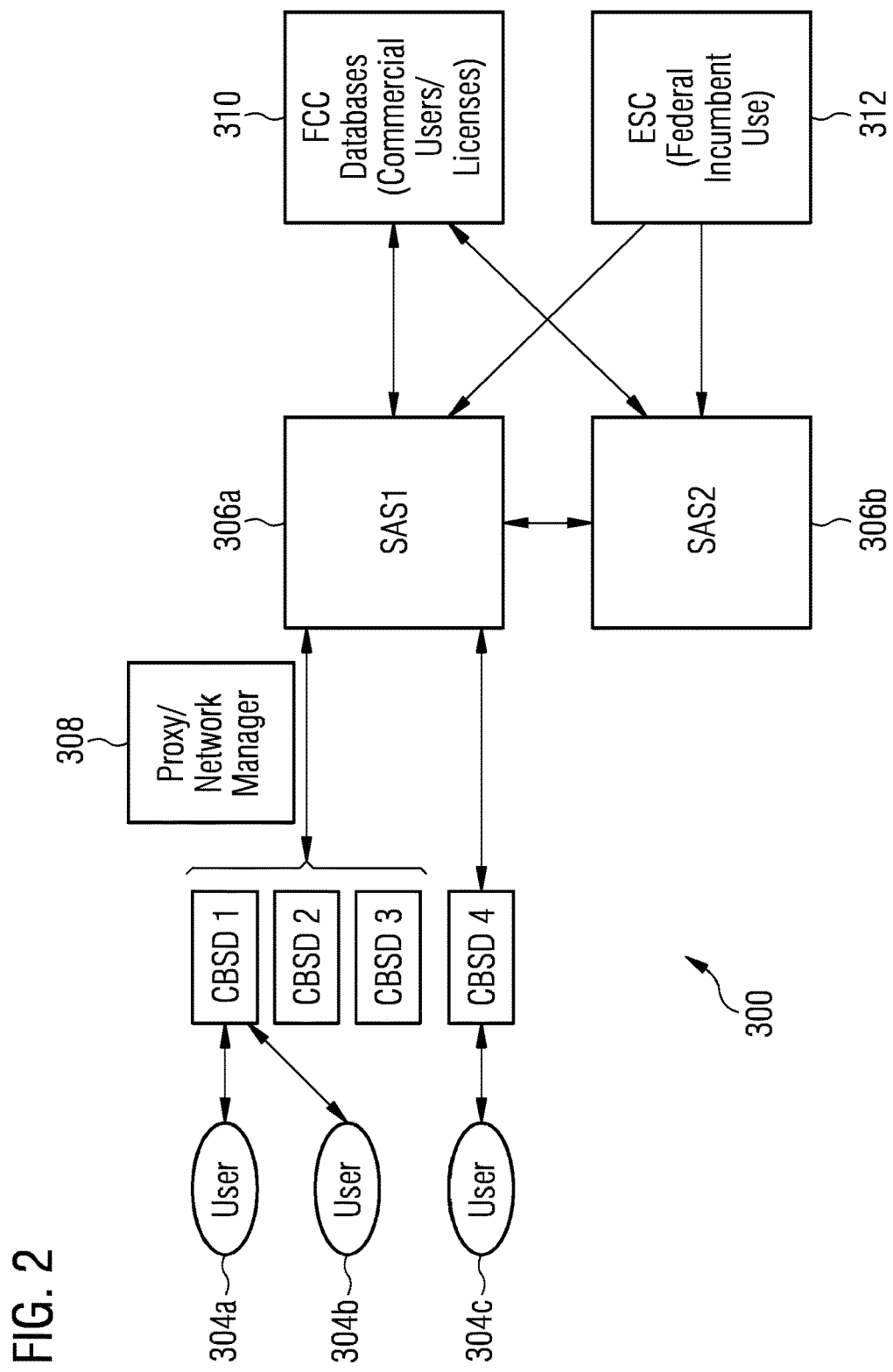
FIG. 2 shows an example of a SAS for spectrum management in accordance with a standard, such as FCC standard.

FIG. 2 shows an example of an FCC SAS for spectrum management as an example of a mobile communication system 300. FIG. 2 shows four access nodes 302a, 302b, 302c, and 302d, which are also referred to as Citizens Broadband Radio Service Devices (CBSD). These access nodes correspond to fixed stations, or networks of such stations, that operate on a Priority Access or General Authorized Access basis in the Citizens Broadband Radio Service consistent with the respective specifications. As shown in FIG. 2 they serve three users 304a, 304b, and 304c in the present example. The access nodes are coupled to a network 306a, e.g. an SAS "SAS1", potentially via Proxy/network manager 308. The network 306a is in communication with FCC databases for commercial users/licenses 310 and with an Environmental Sensing Capability (ESC) 312 for federal incumbent use. As further shown in FIG. 2 there can be another SAS 306b, "SAS2", which is also in communication with the FCC databases 310 and the ESC 312 and which may be in control of a second SAS.

For example, FCC's report and order outlines a sample system with SAS(s) as shown in FIG. 2. The FCC does not specify details of how the SAS has to be implemented and how it needs to perform interference mitigation—though it is an FCC requirement that the SAS performs interference mitigation. Any radio that operates in the 3.5 GHz band in the US will need to follow the three tier system and work with the SAS to perform interference mitigation—which is not optional. The FCC also mandates a SAS that will coordinate the spectrum use between the incumbents, PA and GAA. The SAS is central to this band, and no tier 2 or tier 3 device can operate unless it is in constant communication with the SAS and receives information of when and where to use the 3.5 GHz channels. The SAS has to be approved by the FCC before it can be deployed. Since the SAS is the central coordinator for this spectrum, it needs to have a lot of information about the network and devices.

In fact, FCC mandates most of this information to be contained in the SAS. FCC's Report and Order outlines a sample system with SAS(s) as shown in FIG. 2. If there are multiple SASs, they are supposed to be synchronized with each other. However, the FCC does not specify details of how the SAS have to be implemented and what information has to be synchronized. Regulated power levels may be defined for legacy systems. In SAS, an additional requirement can be introduced by the incumbent/PALs: The incumbent/PAL can create a "protection zone" where the aggregated interference by lower tier users must be below a defined limit (below the regulation limit). Examples may provide mechanisms to ensure that this limit is met without requiring centralized power allocation (thus limiting the required signaling overhead).

Examples may use transitional power (in the sense of a power level between 0 and the maximum) settings. Such levels are also allowed by SAS, but it is not defined how to choose it. Examples introduce a distributed, low-complexity, low-overhead method for identifying the right power levels.

Figure 3:
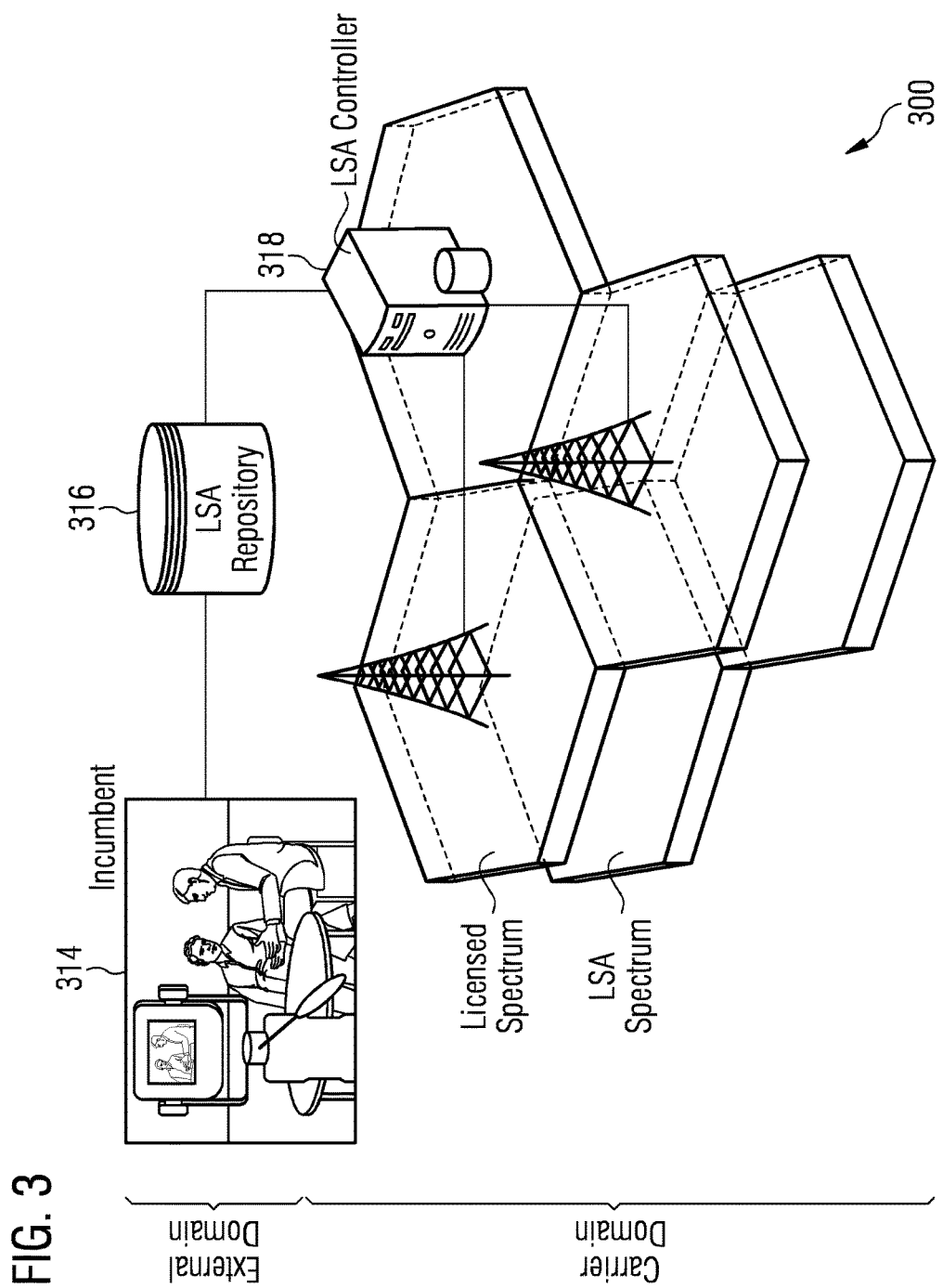
FIG. 3 shows an example of an LSA system.

FIG. 3 shows an example of an LSA system 300 as another example of a mobile communication system 300. An external domain of an incumbent 314 is coupled to an LSA repository 316, which is further coupled to an LSA controller 318 in a carrier domain. The LSA controller 318 controls the access nodes using licensed spectrum and LSA spectrum. The controller 318 may carry out centralized control.

In the following further examples will be described and some assumptions are made to present simulation results in the sequel. As an example, an SAS is assumed. It is further assumed that all GAAs have the same maximum transmit power level, that all GAAs use LBT and have the same LBT sensing floor, and that no GAA will transmit within the range from the location of another GAA to the location where the power of the other GAA drops down to LBT sensing floor. Further details can be found in, for example, FCC 15-47A1, item 72, "opportunistic access to unused Priority Access channels to maximize the flexibility and utility of the 3.5 GHz Band for the widest range of potential users is permitted". It is further assumed that the priority area 20 is a convex shape, if it is concave shape, e.g. rectangle, the area can be increased into a convex shape.

Note, that depending on the specification of different priority access systems terminology may be different. For the priority area 20 as referred to herein different terms may be used. For example, three zones are defined in the LSA system:
an exclusion zone, in which there is no access for secondary systems,
a restriction zone (in which there is limited or restricted access for secondary systems possible, e.g. if certain output power levels are not exceeded, and
a protection zone, in which certain interference levels should not be exceeded.

Definitions can be found in TS 103 154 of ETSI (European Telecommunication and Standards Institute):
protection zone: geographical area within which incumbent receivers will not be subject to harmful interference caused by LSA Licensees' transmissions.
NOTE: A protection zone is defined using specific measurement quantities and thresholds (e.g. a mean field strength that does not exceed a defined value in dBµV/m/MHz at a defined receiver antenna height above ground level). A protection zone is normally applicable for a defined frequency range and time period.
restriction zone: geographical area within which LSA Licensees are allowed to operate radio transmitters, under certain restrictive conditions (e.g. maximum Equivalent Isotropically Radiated Power (EIRP) limits and/or constraints on antenna parameters).
NOTE: A restriction zone is normally applicable for a defined frequency range and time period.
exclusion zone: geographical area within which LSA Licensees are not allowed to have active radio transmitters.
NOTE: An exclusion zone is normally applicable for a defined frequency range and time period.

In SAS context terms may be used differently. In an exclusion zone secondary systems are not allowed if they do not have incumbent-sensing-capability. If they do, the exclusion zone automatically converts into a protection zone, in which a secondary system can be operated under control of an SAS controller. The priority area 20 as used herein may represent any region, zone or area for ensuring rights of priority users independent from of the actual RAT or system architecture.

At least in some examples the access condition comprises an interference level threshold. In other examples other access conditions are conceivable as well, examples are an overall interference level, an individual interference level, a receive power level, a power density level in a certain band or spectrum, a signal-to-noise ratio level, a signal-to-noise-and-interference level, etc.

In the following a further example in an SAS system is further described, where first a power allocation method of an example is detailed. For example, the one or more transmission parameters, which are to be determined comprise a maximum transmission power of the first access node 100. Generally, in examples the transmission parameters are not limited or restricted to power allocation; further examples are beamforming settings (e.g. directions of main beams or minimum antenna gain), average transmission power settings, a peak-to-average power ratio settings, etc. The one or more transmission parameters may comprise a beamforming configuration of the first access node 100. For example, the control module 14 can be configured to adjust at least one of a beam selection, a beam direction and a beam shape based on the priority area information.

In the following it is assumed that all GAAs (access nodes of the category of the first access node 100) have an omnidirectional antenna. Further examples will be detailed in the sequel in which beamforming antennas will assumed and directional settings in terms of beamforming, beam selection, beam direction etc. will also be considered. It is noted, that in some examples, based on an estimated interference level, the control module 14 is configured to suspend transmission of the first access node 100, to allow restricted transmission of the first access node 100, or to allow un-restricted or un-limited transmission of the first access node 100. As indicate above, the control module 14 may be configured to determine whether the first access node 100 is located in an exclusion zone outside the priority area 20 of the second access node 200, in which transmission of the first access node 100 is suspended, a transitional zone outside the priority area 20 of the second access node 200 and outside the exclusion zone, in which transmission of the first access node 100 is restricted, and an open zone outside the priority area 20 of the second access node 200, outside the exclusion zone and outside the transitional zone, in which transmission of the first access node 100 is un-restricted. The priority area 20 may comprise a protection area in which the second access node 200 is protected from interference or predefined interference levels.

It is further assumed that a GAA exclusion zone is located outside of the PAL protection area 20 (e.g. as defined in FCC 15-47A1 for a PAL access node corresponding to an access node of the category of the second access node 200). Within the exclusion zone, the GAAs cannot transmit. Moreover, a GAA transitional zone is assumed outside of the GAA exclusion zone. Within the GAA transitional zone, the GAA may transmit with less than full power. Furthermore, a GAA open zone is assumed outside of the GAA transitional zone. Within the GAA open zone, the GAA can transmit with full power. The definition of the above zones is shown in FIG. 4.

Figure 4:
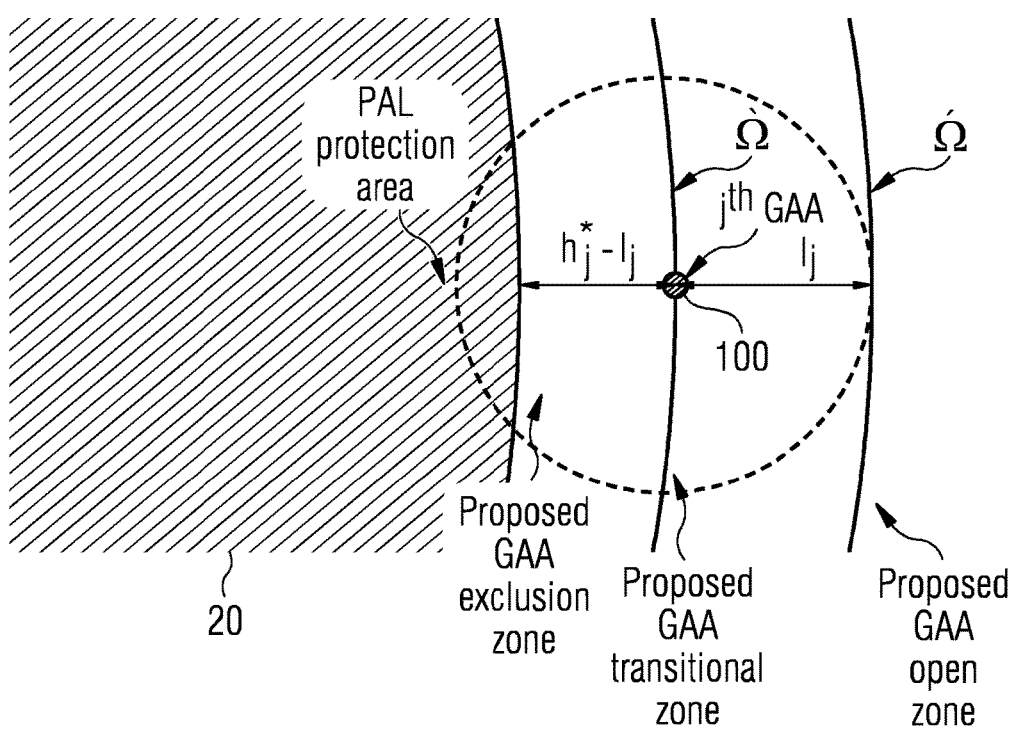
FIG. 4 depicts an illustration of definitions of a GAA exclusion zone, a transitional zone, an open zone and a PAL protection area as defined in FCC in an example.

FIG. 4 depicts an illustration of definitions of a GAA exclusion zone, a transitional zone, an open zone, and a PAL protection area 20 as defined in FCC in an example. FIG. 4 shows an example of a first access node 100 as GAA indexed j. The first access node 100 comprises an access node controller 10 as shown in FIG. 1. The PAL as second access node 200 is assumed at the far left of the GAA 100 outside the depicted range of FIG. 4. The hachured section depicts the priority area 20, which is also referred to as PAL protection area in this example. The boundary of the priority area 20 is located at a distance of $h_j^* - l_j$ from the location of the GAA 100. The distance between the PAL 200 and the GAA 100 is assumed to be $\Omega'$ and the GAA 100 is located on the boundary between the exclusion zone and the transitional zone. The boundary between the transitional zone and the open zone is at a distance $\Omega'$ from PAL 200 and at a distance $l_j$ from the GAA 100.

Figure 5:
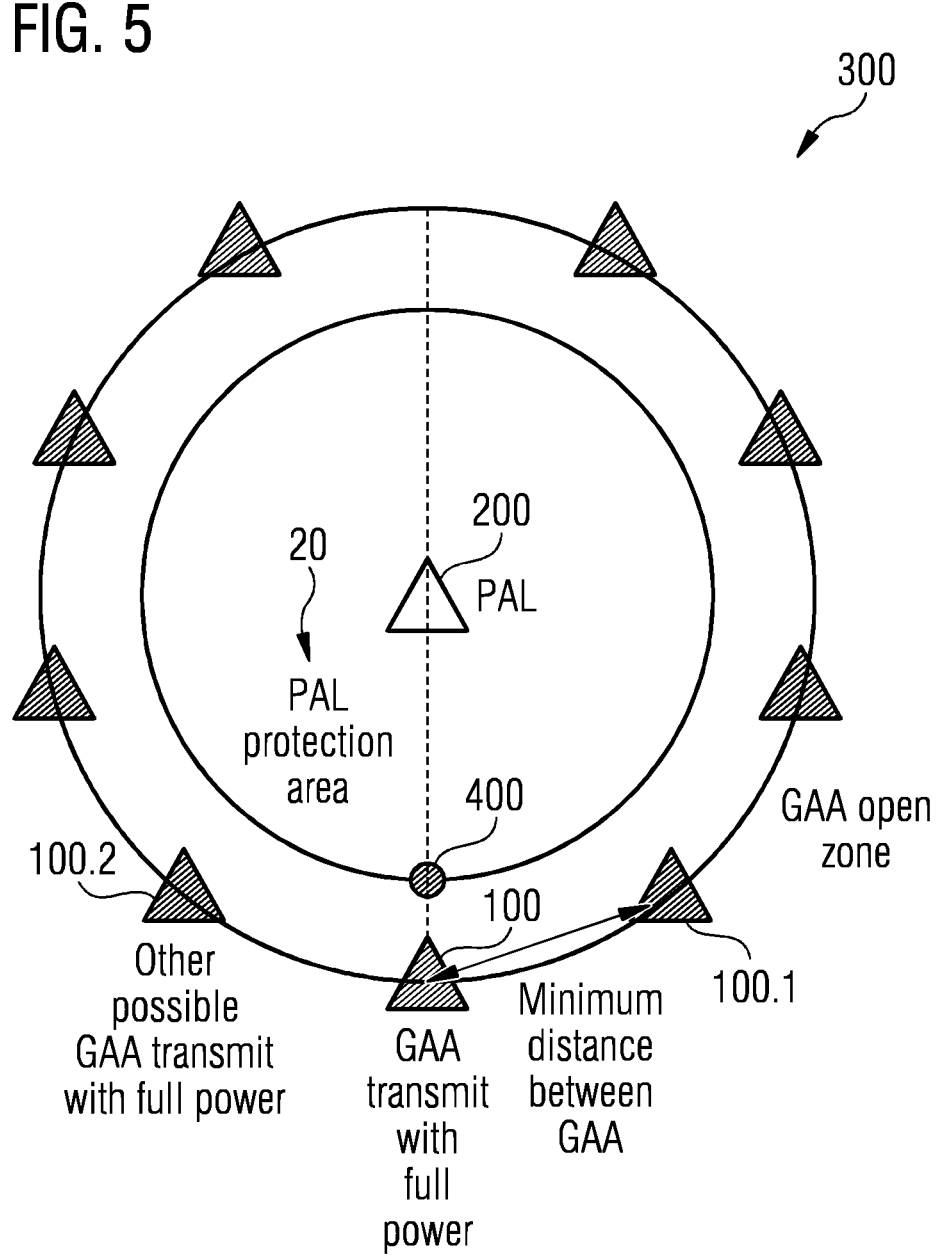
FIG. 5 shows an example of a transmit power calculation in an open zone.

The GAA power allocation procedure is summarized in four steps in the present example:

Step 1: The GAA 100 calculates its distance $h_j^* - l_j$ to the PAL protection area boundary and finds out the point along the PAL protection boundary where the distance is minimum. This is defined as the critical point 400 for this GAA 100 as shown in FIG. 5. FIG. 5 further illustrates the example of a transmit power calculation in an open zone. FIG. 5 shows the PAL 200 in the center surrounded by a number of GAA 100, 100.1, 100.2 and others (reference signs omitted indicated by triangles).

At the boundary of the priority area 20, PAL protection area in this example, the critical point 400 is shown. The triangle 100 represents the reference GAA 100 that is calculating its transmit power and the triangles 100.1 and 100.2 as well as the further triangles not referenced represent the other possible GAAs transmitting with full power. The dot 400 represents the critical point 400 of the reference GAA 100 along the PAL protection area boundary.

In some examples the control module 14 of the access node controller 10 is configured to estimate an interference level at the priority area boundary 400 of the second access node. The control module may be further configured to estimate the interference level at the priority area boundary 400 of the second access node 200 based on a distance $\Omega'$ between the first access node 100 and the second access node 200 or a distance $h_j*-l_j$ between the first access node 100 and the priority area boundary 400 of the second access node 200. In examples, the priority area information may comprise information on or related to at least one of these distances.

For example, such information may comprise location information of the second access node 200 or other information that allows the determination of an interference level. For example, the second access node 200 may broadcast the priority area information such that the first access node 100 can receive the information. Such reception via the one or more interfaces 12 may be carried out in a wired manner, e.g. via a wired interface between the access nodes or also wireless, i.e. using over the air broadcasting. In some examples such information may be broadcast in terms of a neighbor list, i.e. an access node may broadcast information on its neighbor such that any receiving access node could derive priority area information for these neighbors, e.g. by means of direct broadcast or by means of broadcasting access node identifications and an accessible list or table providing priority area information for access nodes. For example, the priority area information of the second access node 200 may be received from the second access node 200. In some examples the priority area information of the second access node 200 may be received from a controlling network node, e.g. an SAS controller.

In examples, the priority area information may comprise at least one of location information of the second access node 200, location information of the priority area of the second access node 200, size or shape information of the priority area of the second access node 200, beamforming information of the second access node 200, radiation pattern information of the second access node 200, transmission power information of the second access node 200, one or more interference thresholds for one or more locations, and signal quality information to be maintained for the second access node 200.

The control module 14 may be further configured to determine an estimated interference level at the priority area boundary 400 of the second access node 200 based on an estimated interference contribution of the first access node 100 at the priority area boundary. The estimated interference contribution is based on the one or more transmission parameters, e.g. a power or beamforming setting. The control module 14 may be further configured to determine the estimated interference level at the priority area boundary based on an assumption that further transmitting access nodes at a predefined distance are transmitting with a predefined interference contribution. Such an example may carry out the following step 2. For example, based on an estimated path loss (e.g. based on a path loss model suiting the scenario, which allows converting a distance into an estimated path loss) and for a given transmission power and antenna gain, an interference at the distance can be estimated.

Step 2: The GAA 100 calculates whether or not it is in the GAA open zone. The GAA 100 assumes that it transmits with full power and all other possible GAAs 100.1, 100.2 etc. that can transmit, are also transmitting at full power. The distance from the location of the GAA 100 to where the signal power of the GAA drops down to the LBT sensing floor (for a given path loss model) can be defined as an "LBT minimum distance", as shown in FIG. 5 between GAA 100 and GAA 100.1. The locations of other possible GAAs are separated from each other with the LBT minimum distance.

When all possible GAAs are transmitting with full power, plus the interference from the reference GAA 100, the aggregated interference at the PAL protection area 20 is maximum and this is the worst case scenario. If other possible GAAs are transmitting with less than full power, they will not cause as much aggregated interference as the worst case.

If the aggregated interference from the reference GAA 100 and all other possible GAAs that transmit with full power to the PAL protection area boundary is less than or equal to the interference threshold, the reference GAA 100 is in the GAA open zone and it can transmit with full power. Otherwise, the GAA 100 cannot transmit with full power and the following step 3 is carried out. FIG. 5 illustrates one example of step 2. The assumption of the locations of other possible GAAs is using the reference GAA 100 as the center to the clockwise and counter clockwise direction around the PAL protection area 20. Only the first tier possible GAAs around the PAL protection area 20 is assumed and all other GAAs have the same minimum distance to the PAL protection area 20 as the reference GAA 100.

Step 3: The GAA 100 calculates or determines whether or not it is within the exclusion zone. The GAA 100 assumes it is the only transmitter and calculates its maximum transmit power to keep the interference threshold along the PAL protection area boundary. One example is that the GAA 100 assumes its signal power drops down to the interference threshold at the critical point 400 and uses the interference threshold divided by the path loss with the distance from the GAA 100 to the critical point 400 to obtain its maximum transmit power.

Figure 6:
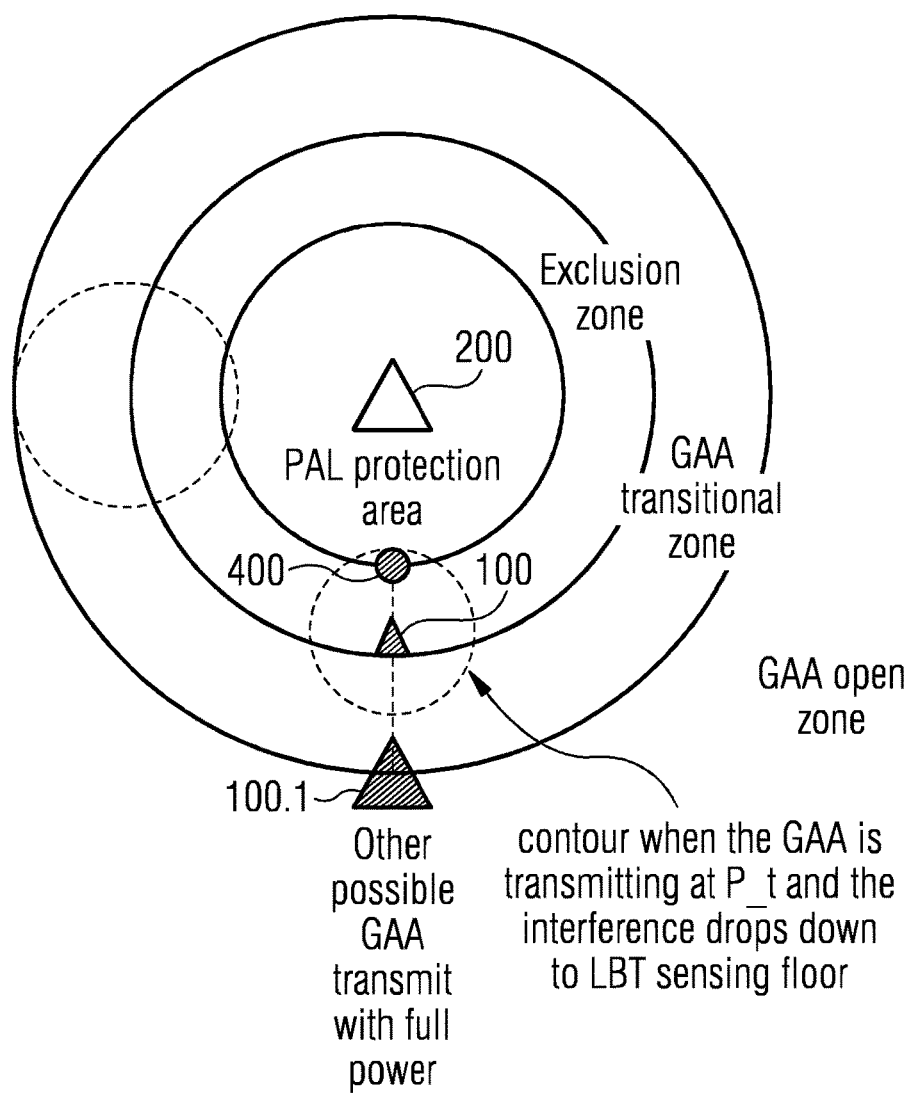
FIG. 6 shows an example of a transmit power calculation in an exclusion zone.

Then, the GAA 100 calculates or determines the GAA open zone by using the same method in step 1 and finds the minimum distance of GAA 100 with full transmit power to the PAL protection area 20. The GAA 100 calculates or determines, with its maximum transmit power whether the LTB sensing range overlaps with the GAA open zone; if not it is within the exclusion zone and cannot transmit. Since there can be another possible GAA outside of the LBT sensing range transmitting with full power that has the same critical point 400 with the reference GAA and cannot hear the reference GAA 100, so that the aggregated interference will be above the threshold. This scenario is illustrated by FIG. 6. FIG. 6 shows an example of a transmit power calculation in an exclusion zone. If a GAA 100 transmits within the exclusion zone, its maximum transmit power will not be high enough to let the other possible full power GAA 100.1 hear it, so that the interference at the critical point 400 cannot be guaranteed.

Otherwise, the GAA 100 is within the GAA transitional zone, between the exclusion zone and the GAA open zone, and the GAA 100 can transmit with less than full power and proceeds with step 4. One example of deciding whether or not the LBT sensing range overlaps with the GAA open zone is that to calculate whether or not the LBT sensing range boundary has at least two intersections with the GAA protection zone boundary.

Step 4: The GAA 100 is in the transitional zone and assumes that it transmits with less than full power and all other possible GAAs that can transmit, are at full power. The distance from the location of the GAA 100 to where the signal power of the GAA drops down to the LBT sensing floor is defined as the "LBT minimum distance". The locations of other GAAs are away from each other with the LBT minimum distance with the reference GAA as the center. The GAA may optimize its transmit power to meet the interference threshold and also maximize capacity. One example is that the GAA 100 considers the closest two possible GAAs with full power to it, as illustrated in FIGS. 7 and 8.

Figure 7:
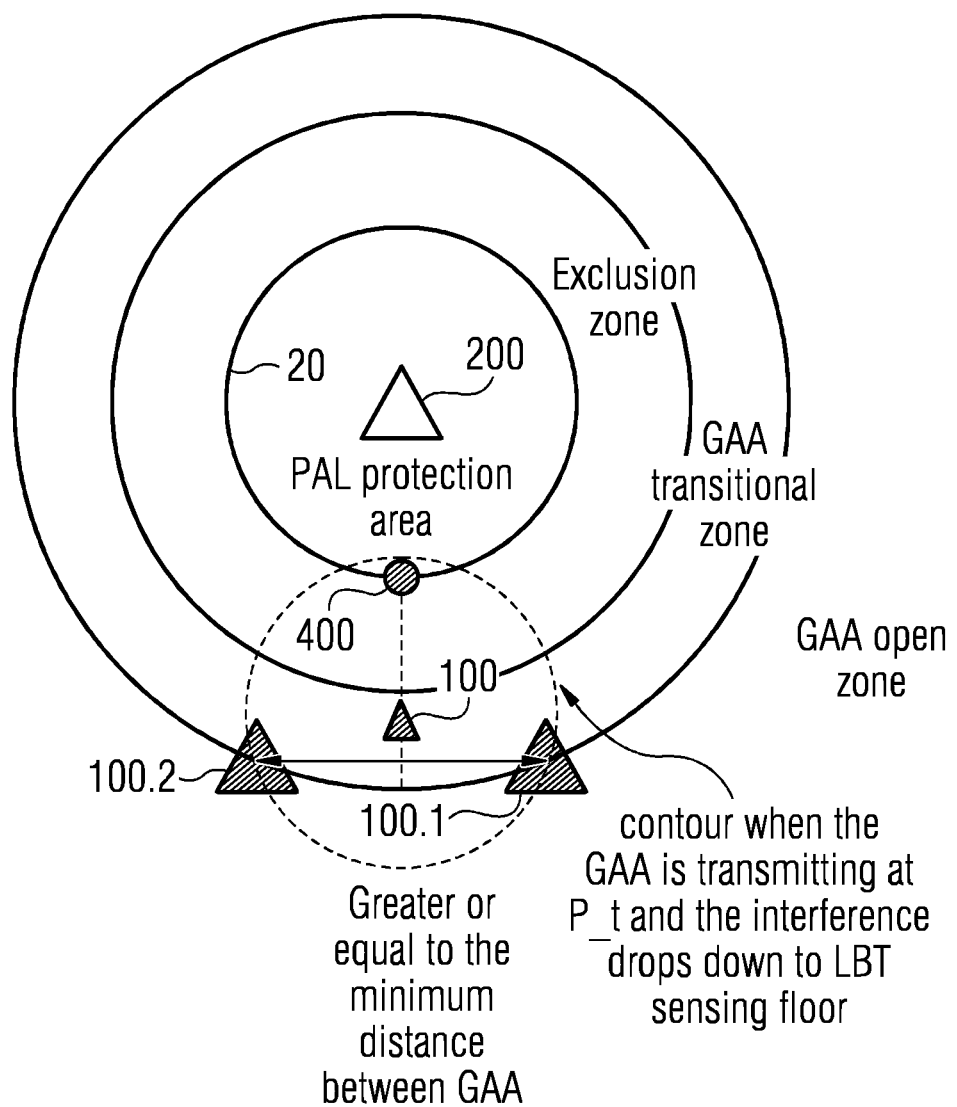
FIG. 7 shows an example of a transmit power calculation in a transitional zone.
Figure 8:
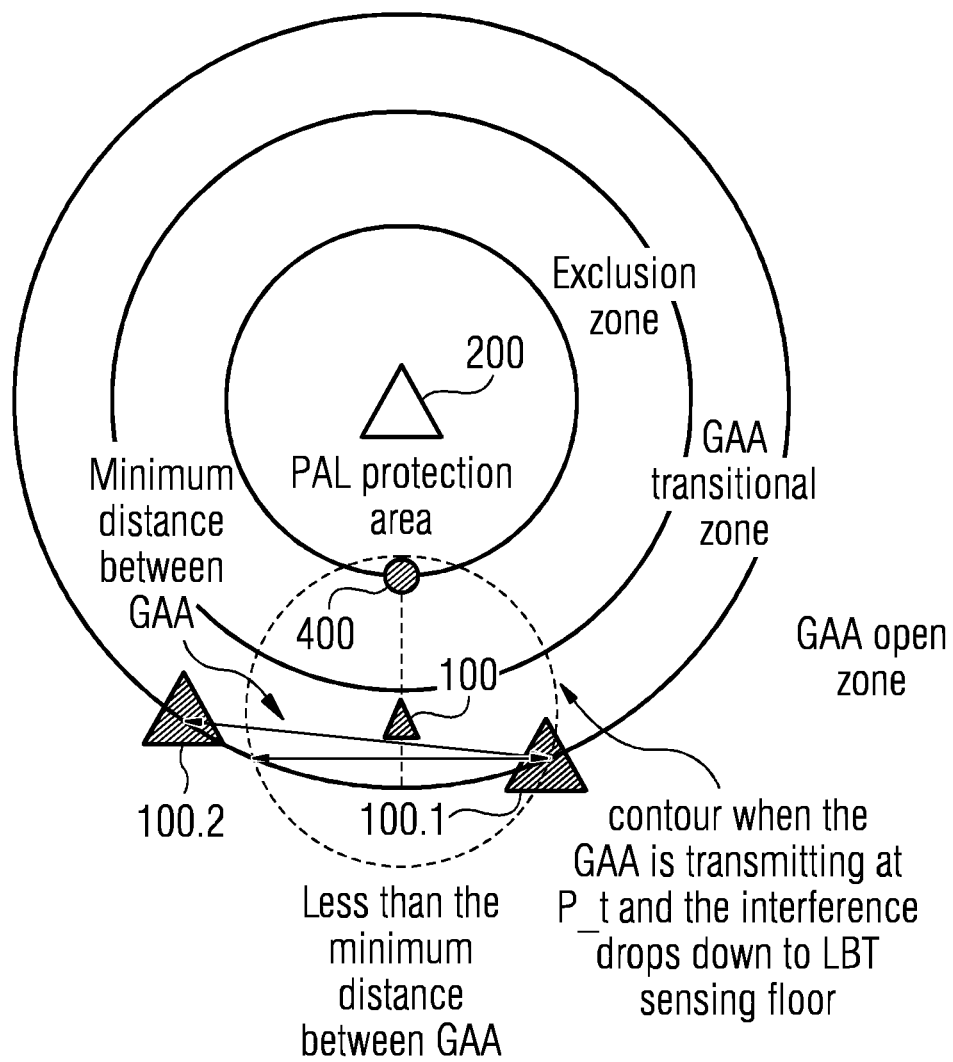
FIG. 8 further illustrates the example of the transmit power calculation in the transitional zone.

FIG. 7 shows an example of a transmit power calculation in a transitional zone and FIG. 8 further illustrates the example of the transmit power calculation in the transitional zone. In FIG. 7 the GAA 100 is between the exclusion zone and the full contour. The GAA 100 can transmit with less than the full power. The possible full power GAA 100.1 will locate at the intersection of the contour when the GAA 100 is transmitting at P_t and the interference drops down to LBT sensing floor. The distance between the intersection is greater or equal to the minimum distance between the full power GAAs 100.1 and 100.2. In FIG. 8, if the distance of the intersection is less than the minimum distance between full power GAAs 100.1 and 100.2, one possible GAA 100.1 will be at one intersection, the other possible GAA 100.2 will be at the full power contour and with the minimum distance away from the first possible GAA 100.1.

The locations of those two GAAs 100.1 and 100.2 will be at the intersection of the LBT sensing range boundary and the GAA open zone boundary, if the distance between the intersection is greater than or equal to the LBT minimum distance between two full power transmitters, as shown in FIG. 7. Otherwise, one possible GAA 100.1 is at one intersection, the other possible GAA 100.2 is at the GAA open zone boundary with the LBT minimum distance away from the first GAA 100.1 closer to the other intersection, as shown in FIG. 8. The GAA 100 may optimize its transmit power with those two GAAs 100.1 and 100.2 to meet the interference threshold at its critical point and also maximize capacity.

Figure 9:
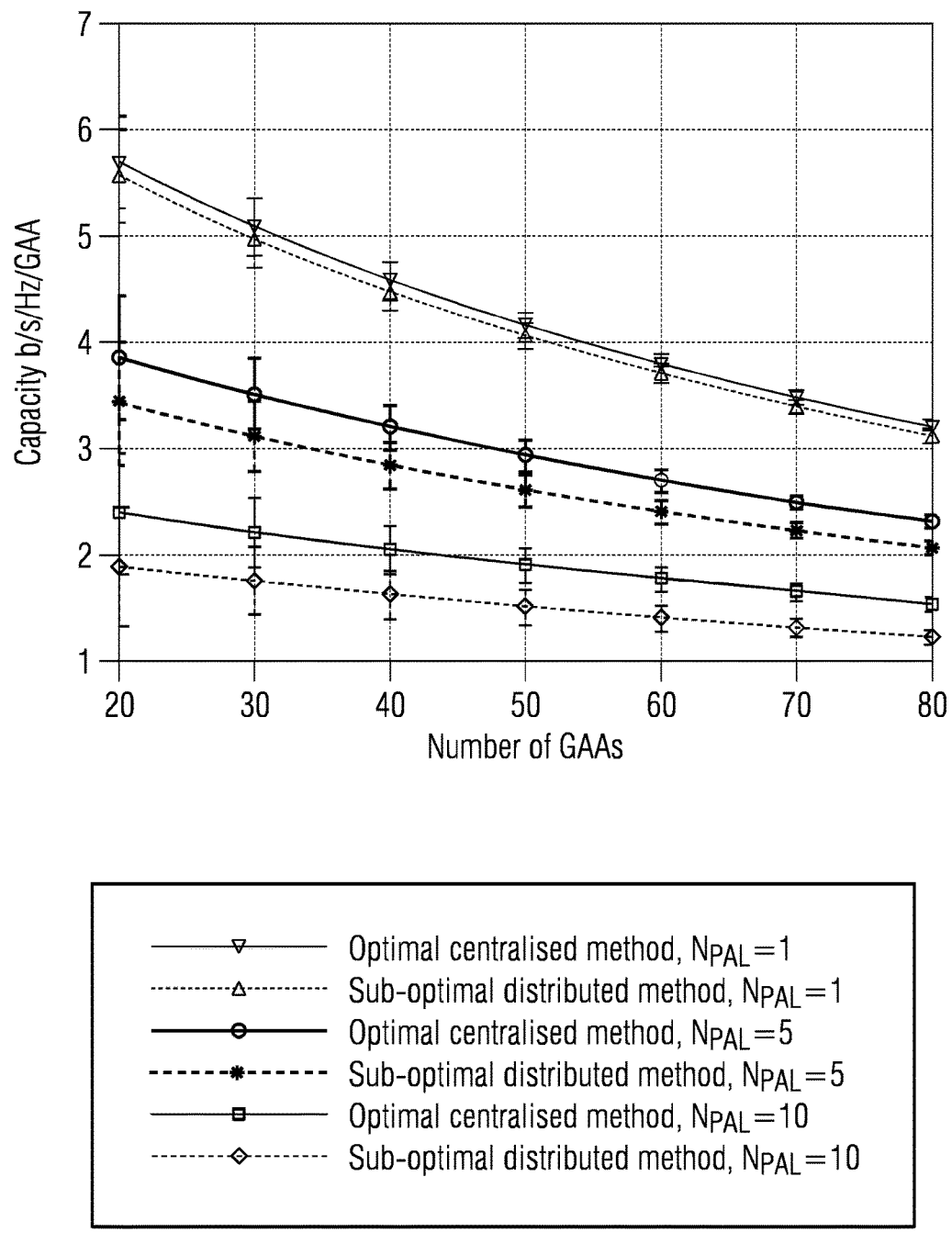
FIG. 9 shows a view chart illustration of simulation results with respect to a capacity comparison between an example and a centralized method for transmit power calculation, the dependency on a number of GAA and a number of PALs is also shown.

In the following simulation results will be presented. FIG. 9 shows a view chart illustration of simulation results with respect to a capacity comparison between an example and a centralized method for transmit power calculation, the dependency on a number of GAA and a number of PALs is also shown. The view chart shows the capacity in bit/s/Hz/GAA (bits per second, Hertz and GAA user on the ordinate versus the number of GAA users on the abscissa. The centralized method is using all locations of all PAL and GAA base stations to optimize the transmit power. The distributed method of the example can achieve approximately 80-90% of the maximum capacity with the centralized method. Simulations with various numbers of PAL base stations, 1, 5 and 10 are shown. FIG. 9 further shows the capacity per GAA and the capacity variance.

Figure 10:
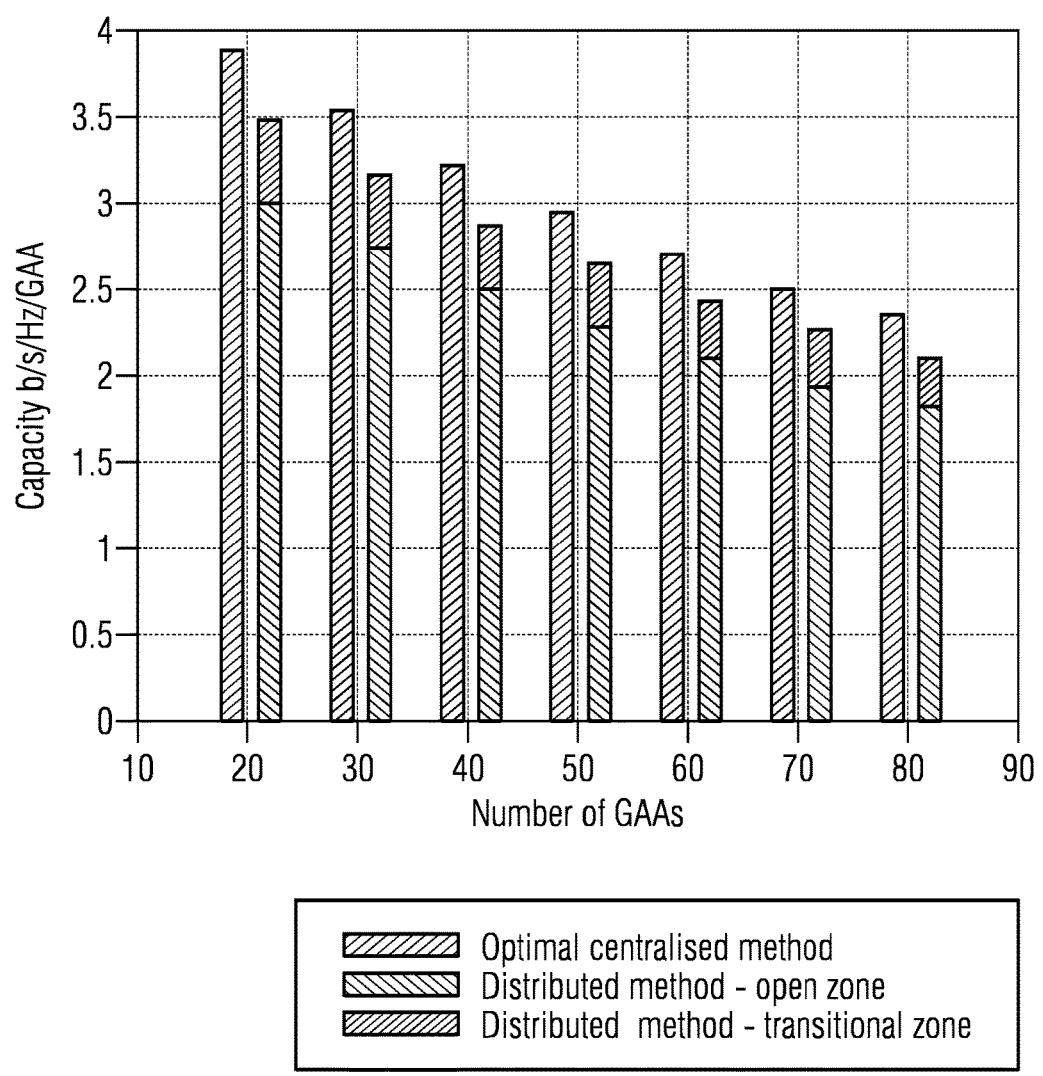
FIG. 10 shows a view chart in a bar graph illustration of simulation results with respect to a capacity comparison between an example and a centralized method for transmit power calculation, the dependency on a number of GAA assuming 5 PALs is shown.

FIG. 10 shows a view chart in a bar graph illustration of simulation results with respect to a capacity comparison between an example and a centralized method for transmit power calculation, the dependency on a number of GAA assuming 5 PAL users is shown. The view chart again shows the capacity in bit/s/Hz/GAA (bits per second, Hertz and GAA user) on the ordinate versus the number of GAA users on the abscissa in bar graph representation, which corresponds to a breakdown of the capacity. The size/height of the bars shows the capacity from different zones. By just allowing the GAA in the open zone to transmit with full power, a large portion of the optimal capacity can already be achieved. By allowing the GAA in the transitional zone to transmit with less than full power, more capacity on top of the previous setting can be gained.

Figure 11:
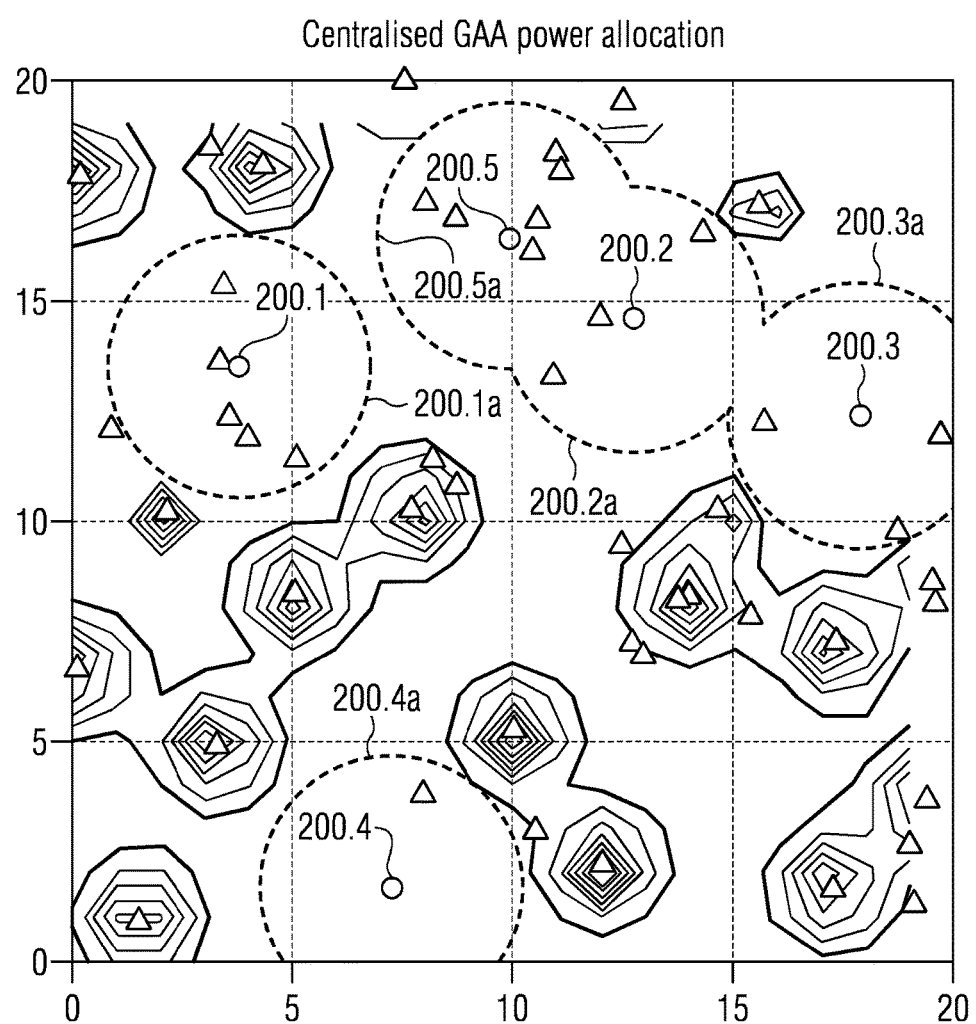
FIG. 11 illustrates a coverage map in an example when using centralized GAA power allocation.
Figure 12:
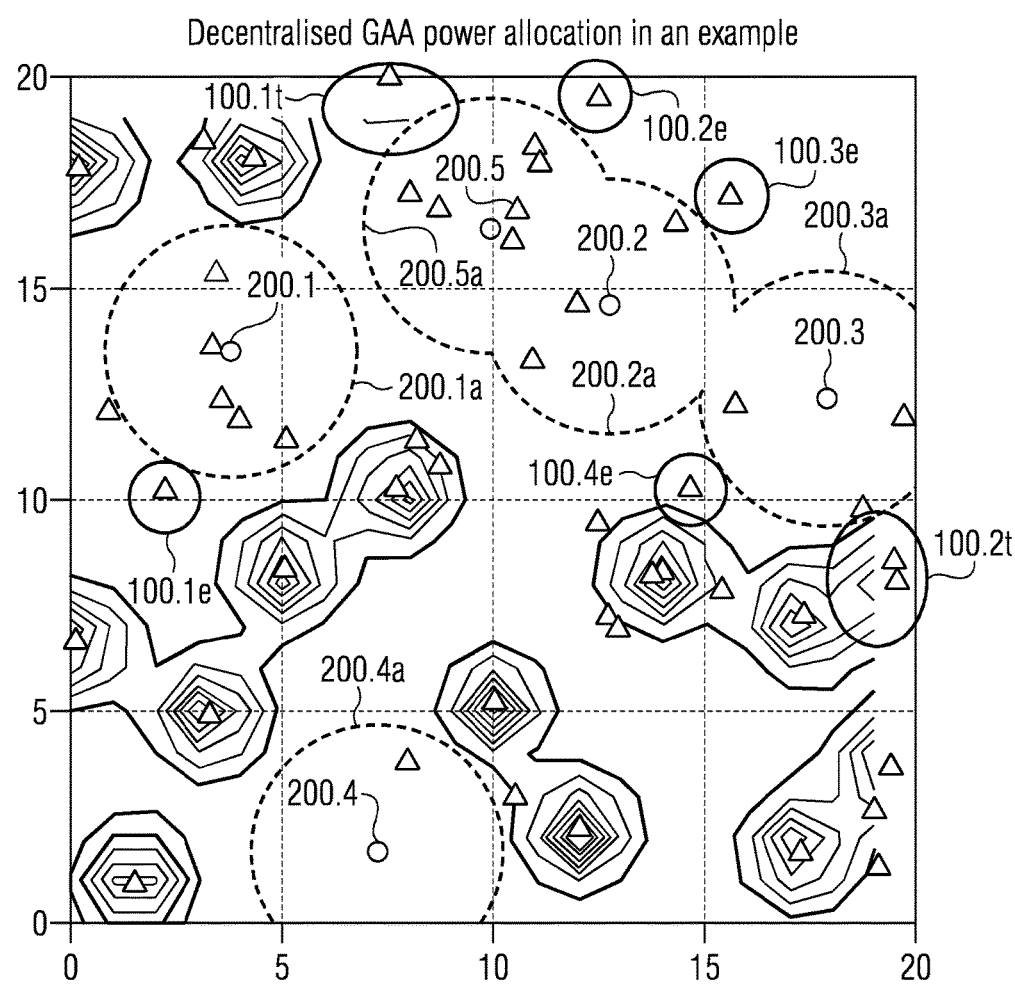
FIG. 12 illustrates a coverage map in another example when using distributed GAA power allocation.

FIG. 11 illustrates a coverage map in an example when using centralized GAA power allocation. FIG. 12 illustrates a coverage map in an example when using distributed GAA power allocation. In FIGS. 11 and 12 the circles 200.1, 200.2, 200.3, 200.4, and 200.5 represent PAL base stations. The regions 200.1a, 200.2a, 200.3a, 200.4a, and 200.5a shown in dashed curves around the PAL access nodes 200.1, 200.2, 200.3, 200.4, and 200.5 represent the PAL protection area. Please note that there can be more than one PAL base station in one PAL protection area. The triangles represent GAA base stations. Contours around GAA base stations are aggregated interference levels. FIG. 11 shows the result of the centralized method that can achieve maximum capacity. FIG. 12 shows the result of a distributed method in an example. The GAA base stations 100.1e, 100.2e, 100.3e, and 100.4e marked with thick circles are the ones within the exclusion zone that cannot transmit and GAA base stations 100.1t and 100.2t are the ones within the GAA transitional zone that transmit with less than full power. The distributed method can keep the aggregated interference below the threshold (i.e. the contours do not overlap with the PAL protection area) and achieve suboptimal capacity, however, being close the theoretical maximum shown in FIG. 11.

Further examples may adapt beamforming at the access node 100 as transmission parameter. Examples may be configured to set a beamforming parameter, a transmission power parameter or both in order to fulfill the access condition. In the following it is assumed that the reference GAA 100 has a directional antenna. A GAA open zone can be defined outside of the priority area 20 where all GAAs may transmit to all directions, cf FIGS. 4, 5, 6, 7 and 8. Moreover, an exclusion zone can be defined in line with the above. Between the PAL protection area (priority area 20) and the exclusion zone, the GAA 100 cannot transmit to any direction. Between the exclusion zone and the GAA open zone, the GAA may tune the direction of the beam or turn off the respective sector of the cell to avoid the interference to the PAL protection area 20 in an example.

In an example, the access node controller 10 may carry out the following steps:

Step 1: The access node controller 10 or GAA 100 will first determine if it can transmit to all directions, assuming all other possible GAAs have omni-directional antennas. The aggregated interference to the PAL protection area 20 is below the threshold. Otherwise step 2 is carried out.

Step 2: The access node controller 10 or GAA 100 will then determine its maximum transmit power by assuming itself as the only transmitter and the side lobe with least power drops down to the interference threshold at the PAL protection area boundary. If, with the maximum transmit power, the LBT sensing range does not overlap with the GAA open zone, the GAA 100 is within the exclusion zone, it cannot transmit. Otherwise, it is between the exclusion zone and the GAA open zone and it can transmit to some directions. The example proceeds with step 3.

Step 3: The GAA 100 will determine the angle to tune the beam with the side lobe with least power directing to the PAL protection area assuming all other possible GAAs transmit to all directions outside of the GAA open zone and transmit with beamforming between the exclusion zone and the GAA open zone. The GAA 100 will improve or even optimize its beamforming scheme to meet the interference threshold to all PAL protection areas, which may also result in further improvement to maximize capacity.

In some embodiments at least one of the first access node and the second access node is a satellite, a drone or another device operating above ground. The above aspects are also applicable if one or even both of the access nodes 100, 200 are satellites, drones or other objects/devices operating above ground. For example, uplink interference may be generated by terminals using satellite bands for terrestrial communication.

Figure 13:
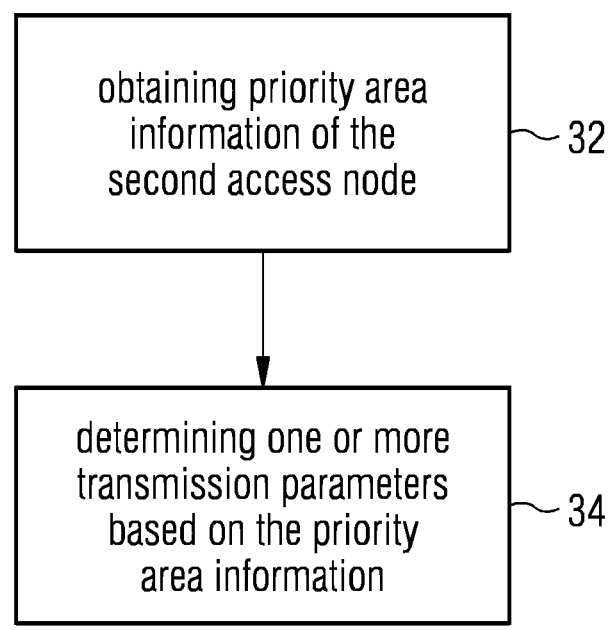
FIG. 13 depicts a block diagram of an example of a method for determining one or more transmission parameters for a first access node of a mobile communication system.

FIG. 13 depicts a block diagram of an example of a method for determining one or more transmission parameters for a first access node 100 of a mobile communication system 300. The mobile communication system 300 further comprises a second access node 200. The method comprises obtaining 32 priority area information of the second access node 200. The second access node 200 has priority access in the priority area 20 compared to the first access node 100. The method further comprises determining 34 the one or more transmission parameters for the first access node 100 based on the priority area information of the second access node 200 and based on an access condition at a priority area boundary.

Another example is a computer program having a program code for performing at least one of the methods described herein, when the computer program is executed on a computer, a processor, or a programmable hardware component. Another example is a machine readable storage including machine readable instructions, when executed, to implement a method or realize an apparatus as described herein. A further example is a machine readable medium including code, when executed, to cause a machine to perform any of the methods described herein.

The examples as described herein may be summarized as follows:

Example 1 is an access node controller (10) for determining one or more transmission parameters of a first access node (100) in a mobile communication system (300). The access node controller (10) comprises one or more interfaces (12) configured to obtain priority area information of a second access node (200) in the mobile communication system. The second access node (200) has priority access in a priority area compared to the first access node (100). The access node controller (10) comprises a control module (14) configured to control the one or more interfaces (12) and configured to determine the one or more transmission parameters of the first access node (100) based on the priority area information of the second access node (200) and based on an access condition at a priority area boundary.

Example 2 is the access node controller (10) of example 1, wherein the second access node (200) is comprised in the mobile communication system (300).

Example 3 is the access node controller (10) of one of the examples 1 or 2, wherein the access condition comprises an interference level threshold.

Example 4 is the access node controller (10) of one of the examples 1 to 3, wherein the control module (14) is configured to estimate an interference level at the priority area boundary of the second access node (200).

Example 5 is the access node controller (10) of example 4, wherein the control module (14) is configured to estimate the interference level at the priority area boundary of the second access node (200) based on a distance between the first access node (100) and the second access node (200) or between the first access node (100) and the priority area boundary of the second access node (200).

Example 6 is the access node controller (10) of example 5, wherein the control module (14) is further configured to determine an estimated interference level at the priority area boundary of the second access node (200) based on an estimated interference contribution of the first access node (100) at the priority area boundary, wherein the estimated interference contribution is based on the one or more transmission parameters.

Example 7 is the access node controller (10) of example 6, wherein the control module (14) is further configured to determine the estimated interference level at the priority area boundary based on an assumption that further transmitting access nodes at a predefined distance are transmitting with a predefined interference contribution.

Example 8 is the access node controller (10) of one of the examples 6 or 7, wherein, based on the estimated interference level, the control module (14) is further configured to suspend trans-mission of the first access node (100), to allow restricted transmission of the first access node (100), or to allow unrestricted transmission of the first access node (100).

Example 9 is the access node controller (10) of one of the examples 1 to 8, wherein the control module (14) is configured to determine whether the first access node (100) is located in an exclusion zone outside the priority area of the second access node (200), in which transmission of the first access node (100) is suspended, a transitional zone outside the priority area of the second access node (200) and outside the exclusion zone, in which transmission of the first access node (100) is restricted, and an open zone outside the priority area of the second access node (200), outside the exclusion zone and outside the transitional zone, in which transmission of the first access node (100) is unrestricted.

Example 10 is the access node controller (10) of one of the examples 1 to 9, wherein the priority area comprises a protection area in which the second access node (200) is protected from interference or predefined interference levels.

Example 11 is the access node controller (10) of one of the examples 1 to 10, wherein the one or more transmission parameters comprise a maximum transmission power of the first access node (100).

Example 12 is the access node controller (10) of one of the examples 1 to 11, wherein the one or more transmission parameters comprise a beamforming configuration of the first access node (100).

Example 13 is the access node controller (10) of example 12, wherein the control module (14) is configured to adjust at least one of a beam selection, a beam direction, and a beam shape, based on the priority area information.

Example 14 is the access node controller (10) of one of the examples 1 to 13, wherein the priority area information of the second access node (200) is received from the second access node (200).

Example 15 is the access node controller (10) of one of the examples 1 to 13, wherein the priority area information of the second access node (200) is received from a controlling network node.

Example 16 is the access node controller (10) of one of the examples 1 to 15, wherein the priority area information comprises at least one of location information of the second access node (200), location information of the priority area of the second access node (200), size or shape information of the priority area of the second access node (200), beamforming information of the second access node (200), radiation pattern information of the second access node (200), transmission power information of the second access node (200), one or more interference thresholds for one or more locations, and signal quality information to be maintained for the second access node (200).

Example 17 is the access node controller (10) of one of the examples 1 to 16, further comprising a transceiver module (16) configured to transmit and receive wireless signals in the mobile communication system (300), wherein the control module (14) is configured to control the transceiver module (16), wherein the control module (14) is configured to sense an interference level using the transceiver module (16) and to suspend transmission of the first access node (100) if a sensed interference level is above a transmission threshold.

Example 18 is the access node controller (10) of one of the examples 1 to 17, wherein at least one of the first access node (100) and the second access node (200) is a satellite, a drone or a device operating above ground.

Example 19 is an apparatus for an access node, the apparatus being configured for determining one or more transmission parameters for a first access node (100) of a mobile communication system (300). The apparatus (10) comprises means for obtaining (12) priority area information of a second access node (200) in the mobile communication system, the second access node (200) having priority access in a priority area compared to the first access node (100), and means for determining (14) the one or more transmission parameters of the first access node (100) based on the priority area information of the second access node (200) and based on an access condition at a priority area boundary.

Example 20 is the apparatus (10) of example 19, wherein the second access node (200) is comprised in the mobile communication system (300).

Example 21 is the apparatus (10) of one of the examples 19 or 20, wherein the access condition comprises an interference level threshold.

Example 22 is the apparatus (10) of one of the examples 19 to 21, wherein the means for determining (14) is configured for estimating an interference level at the priority area boundary of the second access node (200).

Example 23 is the apparatus (10) of example 22, wherein the means for determining (14) is configured for estimating the interference level at the priority area boundary of the second access node (200) based on a distance between the first access node (100) and the second access node (200) or between the first access node (100) and the priority area boundary of the second access node (200).

Example 24 is the apparatus (10) of example 23, wherein the means for determining (14) is further configured for determining an estimated interference level at the priority area boundary of the second access node (200) based on an estimated interference contribution of the first access node (100) at the priority area boundary, wherein the estimated interference contribution is based on the one or more transmission parameters.

Example 25 is the apparatus (10) of example 24, wherein the means for determining (14) is further configured for determining the estimated interference level at the priority area boundary based on an assumption that further transmitting access nodes at a predefined distance are transmitting with a predefined interference contribution.

Example 26 is the apparatus (10) of one of the examples 24 or 25, wherein, based on the estimated interference level, the means for determining (14) is further configured for suspending transmission of the first access node (100), for allowing restricted transmission of the first access node (100), or for allowing unrestricted transmission of the first access node (100).

Example 27 is the apparatus (10) of one of the examples 19 to 26, wherein the means for determining (14) is configured for determining whether the first access node (100) is located in
an exclusion zone outside the priority area of the second access node (200), in which transmission of the first access node (100) is suspended,
a transitional zone outside the priority area of the second access node (200) and outside the exclusion zone, in which transmission of the first access node (100) is restricted, and
an open zone outside the priority area of the second access node (200), outside the exclusion zone and outside the transitional zone, in which transmission of the first access node (100) is unrestricted.

Example 28 is the apparatus (10) of one of the examples 19 to 27, wherein the priority area comprises a protection area in which the second access node (200) is protected from interference or predefined interference levels.

Example 29 is the apparatus (10) of one of the examples 19 to 28, wherein the one or more transmission parameters comprise a maximum transmission power of the first access node (100).

Example 30 is the apparatus (10) of one of the examples 19 to 29, wherein the one or more transmission parameters comprise a beamforming configuration of the first access node (100).

Example 31 is the apparatus (10) of example 30, wherein the means for determining (14) is configured for adjusting at least one of a beam selection, a beam direction, and a beam shape, based on the priority area information.

Example 32 is the apparatus (10) of one of the examples 19 to 31, wherein the priority area information of the second access node (200) is received from the second access node (200).

Example 33 is the apparatus (10) of one of the examples 19 to 31, wherein the priority area information of the second access node (200) is received from a controlling network node.

Example 34 is the apparatus (10) of one of the examples 19 to 33, wherein the priority area information comprises at least one of location information of the second access node (200), location information of the priority area of the second access node (200), size or shape information of the priority area of the second access node (200), beamforming information of the second access node (200), radiation pattern information of the second access node (200), transmission power information of the second access node (200), one or more interference thresholds for one or more locations, and signal quality information to be maintained for the second access node (200).

Example 35 is the apparatus (10) of one of the examples 19 to 34, further comprising means for transmit-ting and receiving wireless signals in the mobile communication system (300), wherein means for determining (14) is configured for sensing an interference level using the means for transmitting and receiving and for suspending transmission of the first access node (100) if a sensed interference level is above a transmission threshold.

Example 36 is the apparatus (10) of one of the examples 19 to 35, wherein at least one of the first access node (100) and the second access node (200) is a satellite, a drone or a device operating above ground.

Example 37 is an access node for a mobile communication system (300) comprising the access node controller (10) of one of the examples 1 to 18 or the apparatus (10) of one of the examples 19 to 36.

Example 38 is a mobile communication system (300) comprising the access node of example 37 as a first access node (100), the communication system (300) further comprising a second access node (200), which has priority access in the mobile communication system (300) compared to the first access node (100).

Example 39 is the mobile communication system (300) of example 38, comprising multiple first access nodes (100) and multiple second access nodes (200), the second access nodes (200) having priority access in the mobile communication system (300) compared to the first access nodes (100), the first access nodes (100) being configured to sense an interference level in the mobile communication system (300) before transmitting and the first access nodes (100) being configured to suspend transmission if a sensed interference level is above a transmission threshold.

Example 40 is a method for determining one or more transmission parameters for a first access node (100) of a mobile communication system (300). The method comprises obtaining (32) priority area information of a second access node (200) in the mobile communication system (300), the second access node (200) having priority access in a priority area compared to the first access node (100), and determining (34) the one or more transmission parameters of the first access node (100) based on the priority area information of the second access node (200) and based on an access condition at a priority area boundary.

Example 41 is the method of example 40, wherein the second access node (200) is comprised in the mobile communication system (300).

Example 42 is the method of one of the examples 40 or 41, wherein the access condition comprises an interference level threshold.

Example 43 is the method of one of the examples 40 to 42, comprising estimating an interference level at the priority area boundary of the second access node (200).

Example 44 is the method of example 43, comprising estimating the interference level at the priority area boundary of the second access node (200) based on a distance between the first access node (100) and the second access node (200) or between the first access node (100) and the priority area boundary of the second access node (200).

Example 45 is the method of example 44, comprising determining an estimated interference level at the priority area boundary of the second access node (200) based on an estimated interference contribution of the first access node (100) at the priority area boundary, wherein the estimated interference contribution is based on the one or more transmission parameters.

Example 46 is the method of example 45, comprising determining the estimated interference level at the priority area boundary based on an assumption that further transmitting access nodes at a predefined distance are transmitting with a predefined interference contribution.

Example 47 is the method of one of the examples 45 or 46, comprising, based on the estimated interference level, suspending transmission of the first access node (100), for allowing restricted transmission of the first access node (100), or for allowing unrestricted transmission of the first access node (100).

Example 48 is the method of one of the examples 40 to 47, comprising determining whether the first access node (100) is located in an exclusion zone outside the priority area of the second access node (200), in which transmission of the first access node (100) is suspended, a transitional zone outside the priority area of the second access node (200) and outside the exclusion zone, in which transmission of the first access node (100) is restricted, and an open zone outside the priority area of the second access node (200), outside the exclusion zone and outside the transitional zone, in which transmission of the first access node (100) is unrestricted.

Example 49 is the method of one of the examples 40 to 48, wherein the priority area comprises a protection area in which the second access node (200) is protected from interference or pre-defined interference levels.

Example 50 is the method of one of the examples 40 to 49, wherein the one or more transmission parameters comprise a maximum transmission power of the first access node (100).

Example 51 is the method of one of the examples 40 to 50, wherein the one or more transmission parameters comprise a beamforming configuration of the first access node (100).

Example 52 is the method of example 51, comprising adjusting at least one of a beam selection, a beam direction, and a beam shape, based on the priority area information.

Example 53 is the method of one of the examples 40 to 52, wherein the priority area information of the second access node (200) is received from the second access node (200).

Example 54 is the method of one of the examples 40 to 52, wherein the priority area information of the second access node (200) is received from a controlling network node.

Example 55 is the method of one of the examples 40 to 54, wherein the priority area information comprises at least one of location information of the second access node (200), location information of the priority area of the second access node (200), size or shape information of the priority area of the second access node (200), beamforming information of the second access node (200), radiation pattern information of the second access node (200), transmission power information of the second access node (200), one or more interference thresholds for one or more locations, and signal quality information to be maintained for the second access node (200).

Example 56 is the method of one of the examples 40 to 55, further comprising transmitting and receiving wireless signals in the mobile communication system (300), sensing an interference level, and suspending transmission of the first access node (100) if a sensed interference level is above a transmission threshold.

Example 57 is the method of one of the examples 40 to 56, wherein at least one of the first access node (100) and the second access node (200) is a satellite, a drone or a device operating above ground.

Example 58 is a computer program having a program code for performing the method of at least one of the examples 40 to 57, when the computer program is executed on a computer, a processor, or a programmable hardware component.

Example 59 is a machine readable storage including machine readable instructions, when executed, to implement a method or realize an apparatus as exemplified in any example described herein.

Example 60 is a machine readable medium including code, when executed, to cause a machine to perform the method of any one of examples 40 to 57.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means" etc., may be implemented in the form of dedicated hardware, such as "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An access node controller for determining one or more transmission parameters of a first access node in a mobile communication system, the access node controller comprising:
   one or more interfaces configured to obtain priority area information of a second access node in the mobile communication system, the second access node having priority access in a priority area compared to the first access node; and
   a control module configured to control the one or more interfaces and configured to
      determine the one or more transmission parameters of the first access node based on the priority area information of the second access node and based on an access condition at a priority area boundary;
      estimate an interference level at the priority area boundary of the second access node based on a distance between the first access node and the second access node or between the first access node and the priority area boundary of the second access node; and
      determine an estimated interference level at the priority area boundary of the second access node based on an estimated interference contribution of the first access node at the priority area boundary, wherein the estimated interference contribution is based on the one or more transmission parameters.

2. The access node controller of claim 1, wherein the second access node is comprised in the mobile communication system.

3. The access node controller of claim 1, wherein the access condition comprises an interference level threshold.

4. The access node controller of claim 1, wherein the control module is further configured to determine the estimated interference level at the priority area boundary based on an assumption that further transmitting access nodes at a predefined distance are transmitting with a predefined interference contribution.

5. The access node controller of claim 1, wherein, based on the estimated interference level, the control module is further configured to suspend transmission of the first access node, to allow restricted transmission of the first access node, or to allow unrestricted transmission of the first access node.

6. An access node controller for determining one or more transmission parameters of a first access node in a mobile communication system, the access node controller comprising:
one or more interfaces configured to obtain priority area information of a second access node in the mobile communication system, the second access node having priority access in a priority area compared to the first access node; and
a control module configured to control the one or more interfaces and configured to
determine the one or more transmission parameters of the first access node based on the priority area information of the second access node and based on an access condition at a priority area boundary; and
determine whether the first access node is located in
an exclusion zone outside the priority area of the second access node, in which transmission of the first access node is suspended,
a transitional zone outside the priority area of the second access node and outside the exclusion zone, in which transmission of the first access node is restricted, and
an open zone outside the priority area of the second access node, outside the exclusion zone and outside the transitional zone, in which transmission of the first access node is unrestricted.

7. The access node controller of claim 1, wherein the priority area comprises a protection area in which the second access node is protected from interference or predefined interference levels.

8. The access node controller of claim 1, wherein the one or more transmission parameters comprise a maximum transmission power of the first access node.

9. The access node controller of claim 1, wherein the one or more transmission parameters comprise a beamforming configuration of the first access node.

10. The access node controller of claim 9, wherein the control module is configured to adjust at least one of a beam selection, a beam direction, and a beam shape, based on the priority area information.

11. The access node controller of claim 1, wherein the priority area information of the second access node is received from the second access node.

12. The access node controller of claim 1, wherein the priority area information of the second access node is received from a controlling network node.

13. The access node controller of claim 1, wherein the priority area information comprises at least one of location information of the second access node, location information of the priority area of the second access node, size or shape information of the priority area of the second access node, beamforming information of the second access node, radiation pattern information of the second access node, transmission power information of the second access node, one or more interference thresholds for one or more locations, and signal quality information to be maintained for the second access node.

14. The access node controller of claim 1, further comprising a transceiver module configured to transmit and receive wireless signals in the mobile communication system, wherein the control module is configured to control the transceiver module, wherein the control module is configured to sense an interference level using the transceiver module and to suspend transmission of the first access node if a sensed interference level is above a transmission threshold.

15. The access node controller of claim 1, wherein at least one of the first access node and the second access node is a satellite, a drone or a device operating above ground.

16. An access node for a mobile communication system comprising the access node controller of claim 1.

17. A mobile communication system comprising the access node of claim 16 as a first access node, the communication system further comprising a second access node, which has priority access in the mobile communication system compared to the first access node.

18. The mobile communication system of claim 17, comprising multiple first access nodes and multiple second access nodes, the second access nodes having priority access in the mobile communication system compared to the first access nodes, the first access nodes being configured to sense an interference level in the mobile communication system before transmitting and the first access nodes being configured to suspend transmission if a sensed interference level is above a transmission threshold.

19. A method for determining one or more transmission parameters for a first access node of a mobile communication system, the method comprising:
obtaining priority area information of a second access node in the mobile communication system, the second access node having priority access in a priority area compared to the first access node;
determining the one or more transmission parameters of the first access node based on the priority area information of the second access node and based on an access condition at a priority area boundary;
estimating an interference level at the priority area boundary of the second access node based on a distance between the first access node and the second access node or between the first access node and the priority area boundary of the second access node; and
determining an estimated interference level at the priority area boundary of the second access node based on an estimated interference contribution of the first access node at the priority area boundary, wherein the estimated interference contribution is based on the one or more transmission parameters.

20. The method of claim 19, wherein the second access node is comprised in the mobile communication system.

21. A non-transitory machine readable medium including code, when executed, to cause a machine to perform a method for determining one or more transmission parameters for a first access node of a mobile communication system, the method comprising:
obtaining priority area information of a second access node in the mobile communication system, the second access node having priority access in a priority area compared to the first access node;
determining the one or more transmission parameters of the first access node based on the priority area information of the second access node and based on an access condition at a priority area boundary;
estimating an interference level at the priority area boundary of the second access node based on a distance between the first access node and the second access node or between the first access node and the priority area boundary of the second access node; and determining an estimated interference level at the priority area boundary of the second access node based on an estimated interference contribution of the first access node at the priority area boundary, wherein the estimated interference contribution is based on the one or more transmission parameters.

* * * * *